Patented July 6, 1937

2,085,749

UNITED STATES PATENT OFFICE 2,085,749

CARBOCYCLIC ADDITION AGENTS

John A. Henricks, Jr., Chicago, Ill., assignor, by mesne assignments, to E. I. du Pont de Nemours & Company, Wilmington, Del., a corporation of Delaware No Drawing. Application July 30, 1934, Serial No. 737,612

16 Claims. (Cl. 204—1)

This invention relates to cadmium plating and is particularly directed to certain novel addition agents for use in cadmium plating, to baths containing them, and to processes of using and making them.

My novel addition agents are carbocyclic compounds which contain a carbonyl, C=O, group. I may add the carbocyclic compounds directly to a plating bath, but I generally prefer to first treat them with an alkali metal cyanide solution. I do not know exactly the nature of the change that occurs when the carbocyclic compounds are treated with cyanide. In the case of benzaldehyde the first change is probably a conversion to benzoin, but the next change may be a further condensation, a true reaction with cyanide, or perhaps both. With some carbocyclic compounds the change may be merely to the enol form, tho more often, I believe, there is some type of condensation and/or true reaction with the cyanide. For the purposes of this application I will refer to the changed products, of whatever nature, as reaction products, and I will refer to the change as a reaction.

While my addition agents are effective in any customary cyanide bath, I prefer to use baths of the kind set forth in U. S. Patent 1,681,509, to Mr. Leon R. Westbrook. These baths are of the cyanide type, and contain a small amount of a compound of a metal of the iron group having an atomic weight greater than 58. The details as to the formulation and use of these baths may be found in the said Patent 1,681,509, and need not be duplicated here.

The plating baths of the said Patent 1,681,509 need to be modified only by employing my novel addition agents in lieu of the addition agents, goulac, dextrine, starch, etc., mentioned therein. While the plating processes described in the said Patent 1,681,509 lead to a bright, hard, dense, and smooth deposit of cadmium, and while the invention therein described and claimed has been widely accepted by the art because of its merit, the substitution of my addition agents for those in the patent results in a cadmium deposit of even greater smoothness, uniformity, and brightness.

Example 1

A typical bath of the type described in Patent 1,681,509 has the following constituents:

| | Grams per liter |
|---|---|
| Sodium cyanide (NaCN) | 130 |
| Cadmium oxide (CdO) | 43 |
| Sodium sulfate (Na$_2$SO$_4$) | 50 |
| Cobalt sulfate (CoSO$_4$·7H$_2$O) | 10 |
| Addition agent | |

As an addition agent the following were successively employed in the amounts noted. The agents were added directly to the bath. They are listed in the approximate order of their desirability:

1. Cyclohexanone _____ 10 cc. per liter
2. Methyl cyclohexanone ____ 10 cc. per liter
3. Benzoin _____ 1 gram per liter
4. Benzaldehyde _____ 3 cc. per liter
5. Anisic aldehyde _____ 1 cc. per liter
6. Cinnamic aldehyde _____ 1 cc. per liter
7. Quinone _____ 1 gram per liter
8. Vanillin _____ 15 grams per liter
9. Ortho-ortho dicarboxy benzoin _____ 1 gram per liter The first four led to bright mirror-like deposits and were quite satisfactory in use. Vanillin and ortho-ortho dicarboxy benzoin operated to some extent, but the results were none too satisfactory.

Instead of adding the agents directly to the bath I usually pretreat them with, preferably, an equivalent amount or more of a sodium or potassium cyanide solution at 45° to 50° C. The temperatures of treatment may vary widely, but I prefer to use between 30° and 70° C. The reaction product obtained may be separated from excess cyanide, if desired, as, for example, by neutralizing with sulfuric acid. The reaction products may be used in widely varying amounts, but it is generally preferable to use an amount equivalent in weight to the amount of starting material that would be used. The pretreated agents usually lead to better results than do the untreated ones. This is probably attributable to the fact that there is a more complete conversion to the desired form in more concentrated cyanide solution and at higher temperatures. When the untreated carbocyclic compounds are added directly to a bath the reaction with cyanide proceeds, probably to produce the same, or similar, product as that produced by a pretreatment, the action merely proceeding more slowly and perhaps less completely.

As a specific example of a pretreatment I give the following:

Example 2

Benzaldehyde was treated at 50° C. for several hours with an excess of sodium cyanide solution. The cyanide solution contained three parts by weight of sodium cyanide to ten parts by weight of water. As the benzaldehyde was added to the cyanide solution a precipitate of some relatively insoluble material formed. After a few hours most of this precipitate had dissolved. The reaction mixture was employed quite successfully with the bath of Example 1.

Benzaldehyde is known to form benzoin in alkaline solution according to the following:

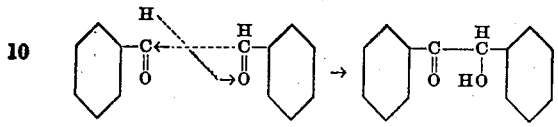

Accordingly I believe that the precipitate noted above was benzoin, and that on further treatment at 50° C. some further change took place which resulted in the formation of a more soluble compound. The benzoin may have reacted with cyanide, condensed further, or perhaps both.

*Example 3*

Benzoin was treated as in Example 1, and after some time a satisfactory addition agent was obtained. By dissolving the benzoin in alcohol and then treating the alcohol solution with cyanide the final product was made more quickly. In the latter procedure the alcohol was removed from the product by distillation. The products obtained by reacting benzoin with cyanide were quite satisfactory addition agents.

*Example 4*

As benzaldehyde and benzoin are difficultly soluble I added two carboxyl groups to benzoin thus:

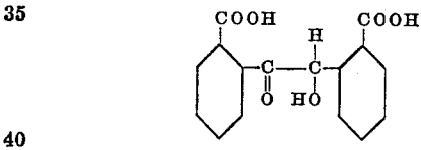

This ortho-ortho dicarboxy benzoin was much more soluble than benzoin, but it was none too satisfactory as an addition agent, as above noted, when added directly to the bath, and pretreating with cyanide according to the procedure of Example 2 did not greatly improve its action.

The other carbocyclic compounds above listed may be pretreated with cyanide according to the procedure of Example 2 with good results. It is here noted that instead of using methyl cyclohexanone I may use other alkyl substituents in lieu of the methyl group. I may, of course, use more than one alkyl substituent.

Instead of pure carbocyclic compounds I may, of course, use products of commercial grade or mixtures of such compounds.

While broadly I may use any carbocyclic compound which contains at least one carbonyl group, I prefer to use compounds which do not contain a carboxyl group and which do not contain sulfur. I also prefer to employ compounds as starting materials which do not contain nitrogen. Michler's ketone, for instance, responds to my broadest definition, but it is none too satisfactory an addition agent. Most specifically, I prefer to employ compounds which contain only carbon, hydrogen, and oxygen as addition agents or as starting materials from which to make cyanide reaction products.

In view of the fact that there is no term which designates the C=O group as it appears in aldehydes and ketones in contradistinction to the C=O group as it appears in acids, etc., I have used "carbonyl group" in this limited sense. Of course, the C=O group appears in acids,

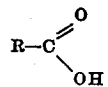

as well as in aldehydes and ketones, but I do not intend the term "carbonyl group" to include the C=O of acids. Strictly, the "carbonyl group" as referred to herein might more accurately be designated a carbonyl group in which a third carbon valence is joined to carbon and in which the remaining valence is satisfied by carbon or by hydrogen. Or, in chemical symbols, the "carbonyl group" as referred to herein is of the type

wherein R is a hydrocarbon radical and wherein R' is hydrogen, in the case of an aldehyde, or R' is a hydrocarbon radical, in the case of a ketone. It is believed that the simple expression "a carbonyl group", as applied to one or more aldehydic or ketonic C=O groups, both simplifies and clarifies the specification and claims, but the expression must be understood in every use, to designate C=O groups of the kind above described.

I desire that it be clearly understood that the whole disclosure of the heretofore mentioned Patent 1,681,509, as well as that of U. S. 1,564,413, to Clayton M. Hoff, cited therein, is to be considered, in its entirety, as an integral part of my disclosure, as my novel addition agents co-act with the cyanide-metal compound baths therein to produce results unexpected from an examination of the attributes of either my addition agents or of the baths of the said patent, for, while good results are obtained with my addition agents in any cyanide bath, the addition agents operate none too well in baths as concentrated as those of Westbrook if the metal additions of the said patent are absent.

As an example of the use of my agents with other baths I give the following:

*Example 5*

Cadmium oxide _____ 26 grams per liter
Sodium cyanide_____ 87 grams per liter
Addition agent The addition agents above described were used in this bath in amounts equal to about one-half that used in the above examples. In any case, the optimum amount for a particular bath is best determined by trying samples of the bath with various quantities of addition agent under the approximate plating conditions that are to be used.

In this bath the cadmium oxide may vary between about 15 and 40 grams per liter without a particularly great change in results. If more than 40 grams per liter is used the bath is too concentrated and the results obtained are not entirely satisfactory. When using my addition agents with baths other than those of the Westbrook type, care must be exercised lest the baths be too concentrated.

In order conveniently to merchandise my novel addition agents, I may incorporate them with the dry ingredients employed to make up a plating bath. The resulting dry mixture can then be packaged and sold to the consumer who needs only to dissolve the mixture in water for use.

Again, I may find it desirable to incorporate the addition agent with only one or a few of the ingredients and let the consumer add the other ingredients. Frequently, of course, it will be desirable to merchandise the novel addition agent as such.

I do not intend to be limited to the illustrative conditions and examples above given, the scope of my invention being set forth in the appended claims.

I claim:

1. A cyanide-cadmium plating composition containing a reaction product of an alkali metal cyanide with a carbocyclic compound which contains a carbonyl group.

2. A cyanide-cadmium plating composition containing a reaction product of an alkali metal cyanide with a carbocyclic compound which contains a carbonyl group, which is substantially free of sulfur and nitrogen, and which contains no carboxyl group.

3. A cyanide-cadmium plating composition containing a reaction product with an alkali metal cyanide of a carbocyclic compound from the group comprising cyclohexanone, alkyl cyclohexanones, benzoin, benzaldehyde, anisic aldehyde, cinnamic aldehyde, and quinone.

4. A cyanide-cadmium plating bath containing a reaction product of an alkali metal cyanide with a carbocyclic compound which contains a carbonyl group.

5. A cyanide-cadmium plating bath containing a reaction product with an alkali metal cyanide of a carbocyclic compound from the group comprising cyclohexanone, alkyl cyclohexanones, benzoin, benzaldehyde, anisic aldehyde, cinnamic aldehyde, and quinone.

6. A cyanide-cadmium plating bath containing a reaction product of an alkali metal cyanide with a carbocyclic compound which contains a carbonyl group, which is substantially free of sulfur and nitrogen and which contains no carboxyl group.

7. A cyanide-cadmium plating bath containing a small amount of a compound of a metal of the iron group having an atomic weight greater than fifty-eight, and a reaction product of an alkali metal cyanide with a carbocyclic compound which contains a carbonyl group.

8. A cyanide-cadmium plating bath containing a small amount of a compound of a metal of the iron group having an atomic weight greater than fifty-eight, and a reaction product of an alkali metal cyanide with a carbocyclic compound which contains a carbonyl group, which is substantially free of sulfur and nitrogen and which contains no carboxyl group.

9. A cyanide-cadmium plating bath containing a small amount of a compound of a metal of the iron group having an atomic weight greater than fifty-eight, and a reaction product of sodium cyanide with a carbocyclic compound from the group comprising cyclohexanone, alkyl cyclohexanone, benzoin, benzaldehyde, anisic aldehyde, cinnamic aldehyde, and quinone.

10. In a cadmium plating process the step comprising electrodepositing cadmium from a cyanide-cadmium bath in the presence of a reaction product of an alkali metal cyanide with a carbocyclic compound which contains a carbonyl group.

11. In a cadmium plating process the step comprising electrodepositing cadmium from a cyanide-cadmium bath in the presence of a reaction product of an alkali metal cyanide with a carbocyclic compound from the group comprising cyclohexanone, alkyl cyclohexanone, benzoin, benzaldehyde, anisic aldehyde, cinnamic aldehyde, and quinone.

12. In a cadmium plating process the step comprising electrodepositing cadmium from a cyanide-cadmium bath in the presence of both a small amount of a compound of a metal of the iron group having an atomic weight greater than fifty-eight, and a reaction product of an alkali metal cyanide with a carbocyclic compound which contains a carbonyl group.

13. In a cadmium plating process the step comprising electrodepositing cadmium from a cyanide-cadmium bath in the presence of both a small amount of a compound of a metal of the iron group having an atomic weight greater than fifty-eight, and a reaction product of an alkali metal cyanide with a carbocyclic compound from the group comprising cyclohexanone, alkyl cyclohexanone, benzoin, benzaldehyde, anisic aldehyde, cinnamic aldehyde, and quinone.

14. A cyanide-cadmium plating bath to which has been added a carbocyclic compound which contains a carbonyl group.

15. In a process for the electrodeposition of cadmium from a cyanide-cadmium bath, the step comprising depositing cadmium from such a bath to which has been added a carbocyclic compound which contains a carbonyl group.

16. A cyanide-cadmium plating bath comprising an addition agent substantially identical with the reaction product of an alkali metal cyanide with a carbocyclic compound which contains a carbonyl group.

JOHN A. HENRICKS, Jr.